United States Patent
Brandt

(10) Patent No.: US 6,534,961 B2
(45) Date of Patent: Mar. 18, 2003

(54) COMPACT DC/DC CONVERTER CIRCUIT

(76) Inventor: Per-Olof Brandt, Trollebergs gård, SE-245 61 Staffanstorp (SE)

( * ) Notice: Subject to any disclaimer, the term of this patent is extended or adjusted under 35 U.S.C. 154(b) by 0 days.

(21) Appl. No.: 09/858,561

(22) Filed: May 17, 2001

(65) Prior Publication Data

US 2001/0043060 A1 Nov. 22, 2001

Related U.S. Application Data

(60) Provisional application No. 60/249,285, filed on Nov. 17, 2000.

(30) Foreign Application Priority Data

May 19, 2000 (GB) .............................. 0012253

(51) Int. Cl.[7] .............................. G05F 1/40
(52) U.S. Cl. ...................... 323/282; 323/222
(58) Field of Search ............... 323/282, 285, 323/351, 288, 222

(56) References Cited

U.S. PATENT DOCUMENTS 5,051,881 A 9/1991 Herold
5,287,261 A * 2/1994 Ehsani ........................ 363/124
5,886,512 A * 3/1999 Becerra ....................... 323/282
6,011,382 A * 1/2000 Littlefield et al. .......... 323/222

FOREIGN PATENT DOCUMENTS

| | | |
|---|---|---|
| EP | 0654911 A2 | 5/1995 |
| GB | 1437813 | 5/1973 |
| GB | 2214430 A | 9/1989 |
| GB | 2245112 A | 12/1991 |
| GB | 2283136 A | 4/1995 |
| GB | 2285187 A | 6/1995 |
| JP | 62/147954 | 7/1987 |
| JP | 4/251559 | 9/1992 |
| JP | 6/327236 | 11/1994 |
| JP | 8/006519 | 1/1996 |
| JP | 8/186979 | 7/1996 |

* cited by examiner

Primary Examiner—Adolf Deneke Berhane

(57) ABSTRACT

A DC/DC converter circuit includes an input capacitor, an inductor, a diode, a transistor, and a control circuit. The control circuit operates to control the transistor. An output capacitor is connected between the output and the input of the circuit. Connection in this way reduces the amount of energy passing through the output capacitor, which usefully reduces the size of the output capacitor.

16 Claims, 2 Drawing Sheets

COMPACT DC/DC CONVERTER CIRCUIT

This application claims priority under 35 U.S.C. §119 and/or 365 to No. 60/249,285 filed in The United States of America on Nov. 17, 2000 and 0012253.1 filed in Great Britain on May 19, 2000; the entire contents of which are hereby incorporated by reference.

BACKGROUND

The present invention relates to DC/DC converters, particularly for use in battery powered electronic equipment.

For battery powered electronic devices, and for radio transmitting devices such as GSM mobile telephones in particular, using a low voltage supply can present difficulties when running radio frequency (RF) and power amplifier (PA) circuitry. It is desirable to use low voltage batteries in such devices, so that the physical size can be kept small and light in weight. Therefore, DC to DC converters are used in order to boost the supply voltage for the device from the battery voltage to a desired level. Typically DC to DC converters run on a switching frequency, for example 400 KHZ, and it is necessary to filter the output of the converter in order to remove any trace of this switching signal. This makes this kind of solution difficult to implement.

One solution is to run the DC to DC converter only during periods that the power amplifier or RF circuitry is not active, and using a storage device, such as a capacitor, to store charge for supply to PA and RF circuitry during periods of activity.

One such solution is shown in FIG. 1 of the accompanying drawings, and a detailed discussion of this type of circuitry can be found in European Patent Application No. EP0654911. In FIG. 1, the DC to DC converter circuit 1 includes an input node 4 and an output node 6. The input node 4 is connected to a DC voltage $V_{supply}$ from a DC source 2. The output node 6 is connected to supply an output voltage $V_{out}$ to a power amplifier 3. The circuit 1 comprises a first capacitor C1 connected between the input node 4 and ground, and an inductor L1 and a diode D1 connected in series between the input node 4 and the output node 6. A transistor T1 is connected between an intermediate node 5, between the inductor L1 and diode D1, and ground. The diode D1 is connected in forward bias between the intermediate node 5 and the output node 6. A control circuit 8 is connected to receive a reference voltage $V_{ref}$ which indicates the desired level of $V_{out}$, and the output voltage $V_{out}$ and is operable to control the switching operation of the transistor T1. The converter circuit 1 is generally known as a switched mode power supply, and is described, for example, in "Advanced Linear European Seminars for Precision Design of the 90's", published by Texas Instruments UK, 1990 page 59 to 82.

A second capacitor C2 is connected between the output node 6 and ground, such that during inoperative times of the power amplifier, the capacitor C2 is charged to the required PA operating voltage. When the operating voltage is required by the power amplifier 3 it can be supplied without the need for switching of the supply. This removes the need for complex filtering of the output voltage $V_{out}$.

However, the problem with this kind of solution is that it requires a very large capacitor C2 which consumes a large amount of space and is expensive.

SUMMARY

Accordingly, a DC converter circuit embodying the present invention includes an output capacitor which is connected between the output node and the input node of the device.

DETAILED DESCRIPTION OF THE PREFERRED EMBODIMENT

Figure 1:
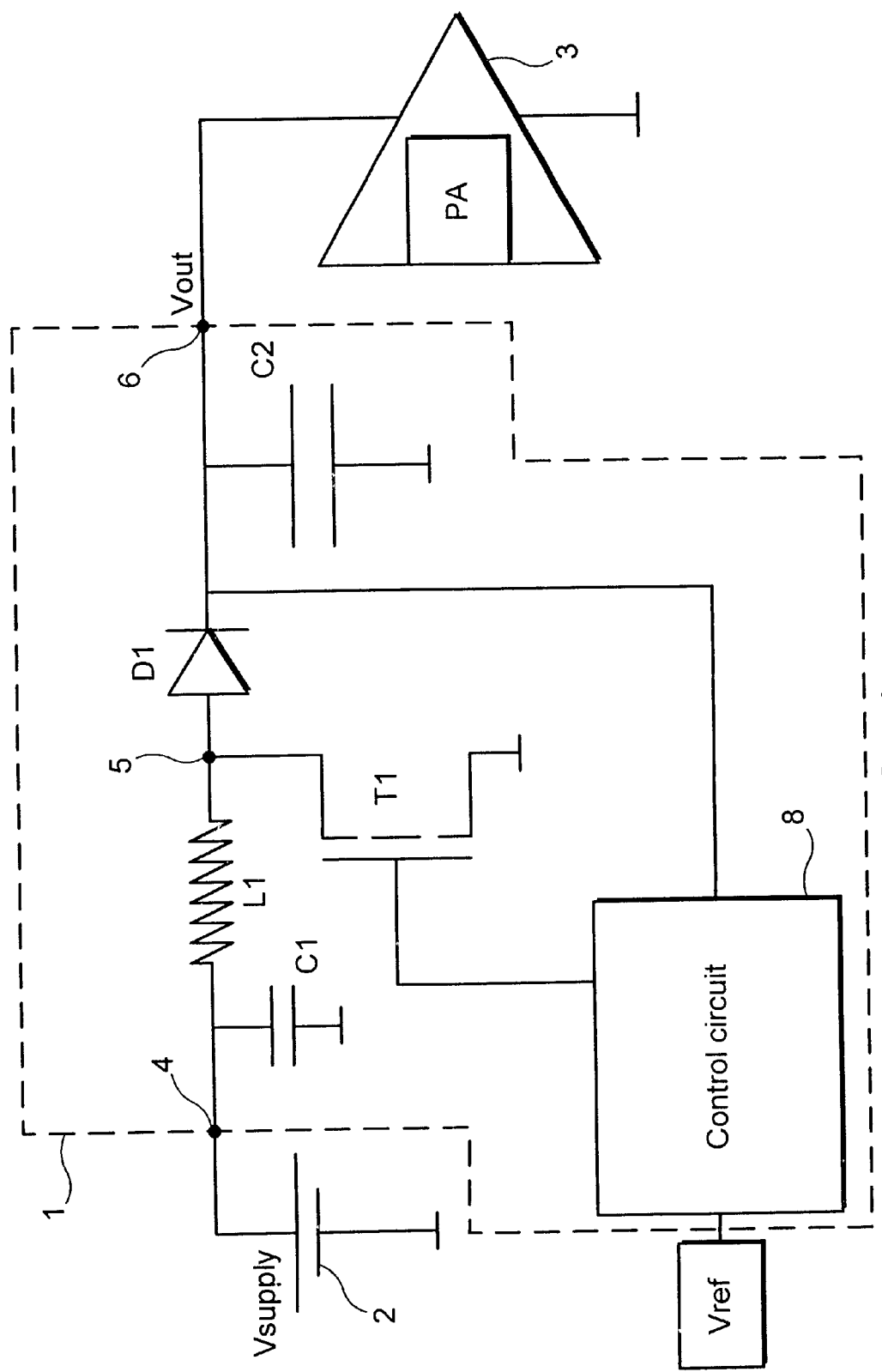
FIG. 1 is a schematic diagram of a previously considered DC/DC converter.
Figure 2:
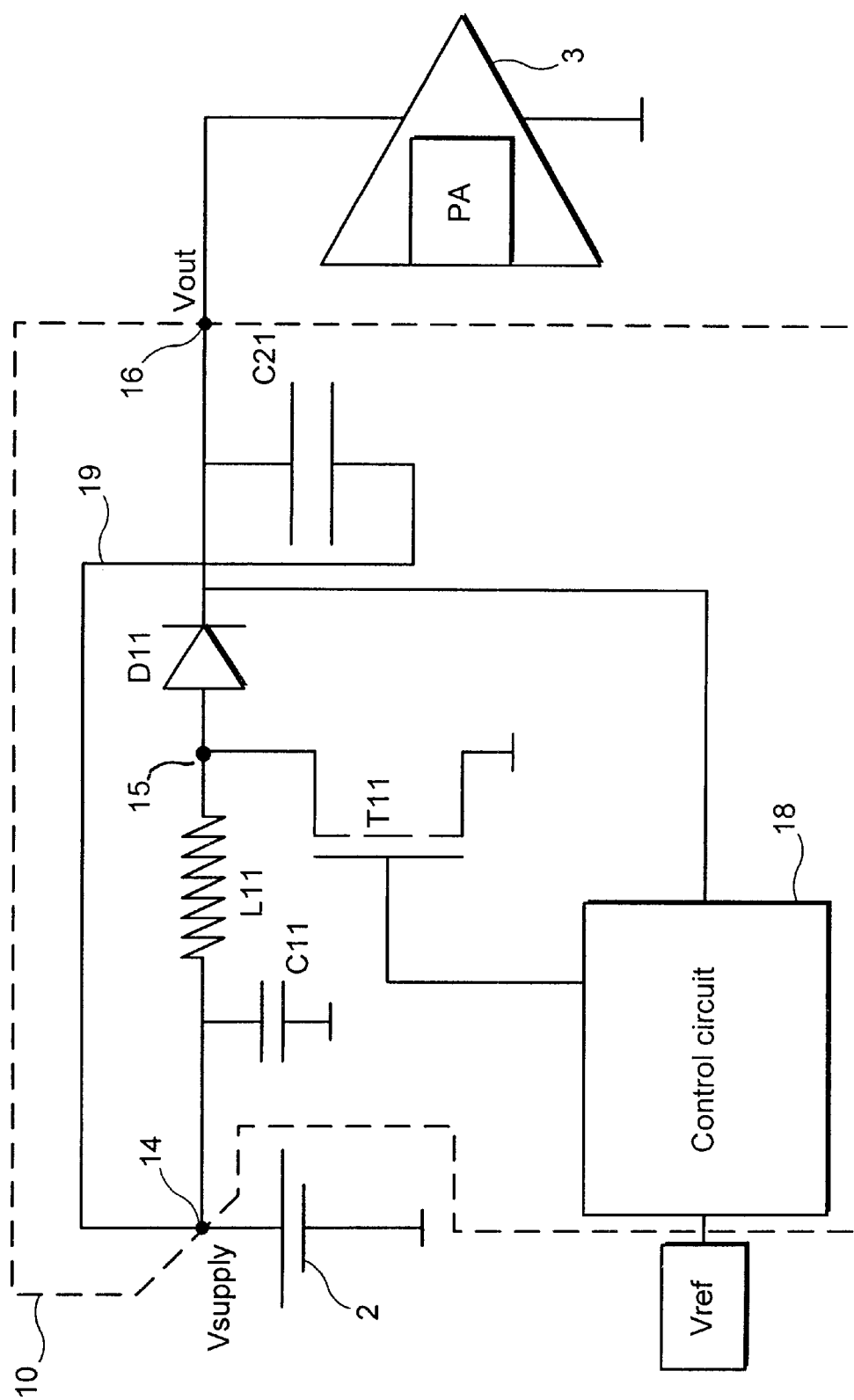
FIG. 2 is a schematic diagram of a DC/DC converter embodying the present invention.

FIG. 2 illustrates schematically a DC/DC converter embodying the present invention. The FIG. 2 converter 10 has similarities with the FIG. 1 converter and includes an input node 14 and an output node 16. The input node 14 connects to the DC input voltage $V_{supply}$ from the DC source 2, as before. A first capacitor C11 is connected between the input node 14 and ground, and an inductor and forward biassed diode D11 are connected in series between the input node 14 and the output node 16. At an intermediate node 15 between the inductor L11 and the diode D11, a transistor T11 is connected to ground. A control circuit 18 is connected to receive a reference voltage $V_{ref}$ and the output voltage $V_{out}$ and operates to control the switching of the transistor T11.

A second capacitor C21 is connected between the output node 16 and the input node 14, by way of link 19. By connecting the capacitor to the supply voltage, rather than to ground, the capacitor C21 is no longer required to supply all of the energy needed at the operating voltage during radio and power amplifier active periods. Instead, the capacitor only stores part of the energy required. Thus, the PA is supplied, during active periods, by the charged capacitor in series with the supply. This enables a smaller second capacitor C21 to be used, which is less expensive than the second capacitor in the FIG. 1 circuit.

For example, if the supply voltage $V_{supply}$ is x volts and the power amplifier 3 requires a voltage of 1.5x volts, then the C2 capacitor of the FIG. 1 circuit must have a capacitance of Y for a given voltage drop during the PA active period. The voltage drop across the second capacitor C2 of FIG. 1 will be 1.5x volts.

The FIG. 2 capacitor C21 must have the same capacitance value, but since the voltage across the capacitor is only one third (0.5x volts) of what it would be in the FIG. 1 situation, the size reduction in capacitor is likely to be at least 66%. for a given capacitor technology. Although embodiments of the invention do not reduce the requirements on the battery as much as in the prior art, the gains in space savings and cost savings are significant. For example in a real application for GSM, with a two watt output power, the size reduction can be up to 60 to 70 square millimeters.

What is claimed is:

1. A DC/DC converter circuit comprising:
   an input node for receiving an input DC signal;
   an output node for outputting an output DC signal;
   a first capacitor connected between the input node and ground;
   an inductor connected between the input node and an intermediate node of the circuit;
   a diode connected in forward bias between the intermediate node and the output node;
   a transistor connected between the intermediate node and ground;
   a control circuit for controlling operation of the transistor and connected thereto; and
   a second capacitor connected to the output node,
   characterized in that the second capacitor is connected between the output node and the input node.

2. A circuit as claimed in claim 1, used in a switched mode application, such that the second capacitor is charged during an inactive period.

3. A portable electronic device including a DC/DC converter as claimed in claim 1.

4. A mobile telephone including a DC/DC converter as claimed in claim 1.

5. A personal digital assistant (PDA) including a DC/DC converter as claimed in claim 1.

6. An electronic organizer including a DC/DC converter as claimed in claim 1.

7. A DC circuit including a battery, a load connected to the battery, and a capacitor, wherein the capacitor is connected in series with the battery and acts as a storage device for supplying the load with a energy via a second path, said second path being in parallel with a first between the battery and load, each of said paths for supplying a portion of an energy required by the load.

8. a circuit as claimed in claim 7, wherein the load is a power amplifier of TDMA communications system.

9. A circuit as claimed in claim 7, wherein a voltage across the capacitor is positive with respect to the load.

10. A circuit as claimed in claim 7, wherein a voltage across the capacitor is negative with respect to the load.

11. A DC/DC converter circuit comprising:

an input node for receiving an input DC signal;

an output node for outputting an output DC signal;

a first capacitor connected between the input node and ground;

an inductor connected between the input node and an intermediate node of the circuit;

a diode connected in forward bias between the intermediate node and the output node, wherein the inductor and diode are in series to provide a first path for energy to the output node;

a transistor connected between the intermediate node and ground;

a control circuit connected to the transistor for controlling operation of the transistor; and a second capacitor connected between the output node and the input node, wherein the second capacitor is in parallel with the first path to provide a second path for energy to the output node, said output DC signal being comprised of the sum of the energy received from the first and second paths.

12. A circuit as claimed in claim 11, used in a switched mode application, such that the second capacitor is charged during an inactive period.

13. A portable electronic device including a DC/DC converter as claimed in claim 11.

14. A mobile telephone including a DC/DC converter as claimed in claim 11.

15. A personal digital assistant (PDA) including a DC/DC converter as claimed in claim 11.

16. An electronic organizer including a DC/DC converter as claimed in claim 11.

* * * * *